(12) United States Patent
Naegele et al.

(10) Patent No.: US 6,272,913 B1
(45) Date of Patent: *Aug. 14, 2001

(54) APPARATUS FOR DETECTING THE PRESSURE AND TEMPERATURE IN THE INTAKE TUBE OF AN INTERNAL COMBUSTION ENGINE, AND METHOD FOR PRODUCING IT

(75) Inventors: Erwin Naegele, Hessigheim; Winfried Kuhnt, Stuttgart, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,951
(22) PCT Filed: May 13, 1998
(86) PCT No.: PCT/DE98/01326
  § 371 Date: Oct. 22, 1999
  § 102(e) Date: Oct. 22, 1999
(87) PCT Pub. No.: WO99/05477
  PCT Pub. Date: Feb. 4, 1999

(30) Foreign Application Priority Data
Jul. 22, 1997 (DE) .............................................. 197 31 420

(51) Int. Cl.⁷ .................................................. G01M 15/00
(52) U.S. Cl. ............................................................ 73/118.2
(58) Field of Search .................................. 73/116, 117.2, 73/117.3, 118.1, 118.2; 340/438, 439

(56) References Cited

U.S. PATENT DOCUMENTS

| | | | |
|---|---|---|---|
| 4,644,784 | * 2/1987 | Okano et al. | ........................ 73/117.3 |
| 5,031,450 | * 7/1991 | Nakaniwa et al. | ...................... 73/115 |
| 5,544,529 | * 8/1996 | Mitani et al. | ........................... 73/716 |
| 5,698,780 | * 12/1997 | Mizutani et al. | .................... 73/118.2 |
| 5,808,189 | * 9/1998 | Toyoda | ................................. 73/118.2 |
| 6,014,961 | * 1/2000 | Gates . | |
| 6,044,826 | * 4/2000 | Bayerle et al. | ...................... 73/117.3 |

* cited by examiner

Primary Examiner—Eric S. McCall
(74) Attorney, Agent, or Firm—Ronald E. Greigg; Edwin E. Greigg

(57) ABSTRACT

An apparatus for detecting the pressure and temperature in the intake tube of an internal combustion engine. A temperature sensor and a pressure sensor are secured to a carrier together with an evaluation circuit in a common housing with as little strain as possible. The housing includes at least two chambers separate from one another, one of which forms a pressure chamber that communicates with the intake tube via a stub and is sealed off from the environment in which the pressure sensor is secured. The other chamber serves to secure the temperature sensor therein by use of connection elements, and sealing adhesive connections that decouple mechanical strains for securing the carrier and sealing off the pressure sensor.

16 Claims, 4 Drawing Sheets

APPARATUS FOR DETECTING THE PRESSURE AND TEMPERATURE IN THE INTAKE TUBE OF AN INTERNAL COMBUSTION ENGINE, AND METHOD FOR PRODUCING IT

PRIOR ART

The invention relates first to an apparatus for detecting the pressure and temperature in the intake tube of an internal combustion engine, where a temperature sensor and a pressure sensor, the latter secured to a carrier together with an evaluation circuit with as little strain as possible, are disposed in a common housing.

An apparatus for detecting the pressure and the temperature in the intake tube of an internal combustion engine in which a temperature sensor and a pressure sensor are disposed in a common housing, is known for instance from German Patent DE 28 51 716 C1.

The combination of a pressure sensor known for instance from German Patent Disclosure DE 43 17 312 A1 with a temperature sensor is shown in FIG. 4.

In the pressure sensor shown in FIG. 4, a single-chip silicon pressure sensor (not shown) is used, which includes a sensor cell in which the pressure is introduced to the back side of a diaphragm, and a reference vacuum is provided on the front side of the diaphragm for measuring the absolute pressure. The pressure sensor is accommodated in a hermetically sealed to housing 82, which in turn is disposed in the housing 80 of the overall apparatus for detecting the pressure and the temperature. Also disposed in the housing 80 is a conductor plate 83 with capacitors, which are required with a view to electromagnetic compatibility. The conductor plate 83 also serves the purpose of a connection with flat plug contacts 84, which are disposed in a stub 85 formed onto the housing 80.

In a pressure stub 88, there is also a temperature sensor 86 injection-molded into a tubular plastic sleeve 87, the temperature sensor being in the form of an NTC resistor, whose terminal lines are electrically conductively connected to flat plug contacts 84 via inlay parts 90 welded to the NTC wires.

This kind of apparatus for detecting the pressure and temperature is not only very complicated to produce; for instance, the electrical connections between the terminal lines of the temperature sensor 86 and of the pressure sensor 82 and the conductor plate 85 and the flat plug contacts 84 must be made in the fully assembled state by means of a soldered connection. This soldered connection must then be potted for sealing purposes with an adhesive composition 89, for instance.

It is also problematic in such an apparatus that the temperature sensor 86 is disposed in a plastic sleeve 87, because this results in what for many applications is an excessively long response time of the temperature sensor 86.

German Patent Application 197 11 939.5, which was not published prior to the priority date of the present application, discloses an apparatus for detecting the pressure and the temperature in the intake tube of an internal combustion engine in which, to introduce a medium that is under pressure, a stub part secured to the housing and an adapter piece connected both to the carrier and to the stub part via sealing adhesives that decouple mechanical strains are provided.

Such an apparatus does enable very good decoupling of strain by means of the adapter, which is connected both to the stub part and to the carrier solely via elastic sealing adhesives. However, its relatively complicated manufacture is problematic in such an apparatus. That is, first the adapter has to be secured to the carrier before the stub part can finally be secured.

Furthermore, strain in the pressure sensor cannot be precluded completely, because the carrier is secured to a housing wall and to that extent is acted upon on one side by pressure that acts on the pressure sensor, so that slight strains can still occur.

It is therefore an object of the invention to refine an apparatus for detecting the pressure and temperature in the intake tube of an internal combustion engine as generically defined above in such a way that while being very simple to produce it enables very precise pressure measurement.

ADVANTAGES OF THE INVENTION

This object is attained, in an apparatus for detecting the pressure and temperature in the intake tube of an internal combustion engine of the type described at the outset, according to the invention in that the housing includes at least two chambers separate from one another. One chamber forms a pressure chamber communicating with the intake tube via a stub and sealed off from the environment. The pressure chamber protrudes into the part of the carrier on which the pressure sensor is secured, and the other chamber serves to receive and secure the remaining portion of the carrier with electrical connection elements, and for securing the carrier and sealing off the pressure chamber, sealing adhesive connections that decouple mechanical strains are provided.

Dividing the housing into at least two chambers separate from one another, into one of which the part of the carrier to which the pressure sensor with the evaluation circuit is secured protrudes and the other serves to secure the remainder of the carrier with the electrical connection elements, where sealing adhesive connections that decouple mechanical strains are provided for securing the carrier and sealing off the pressure chamber, has the particularly great advantage that the part to which the pressure sensor is secured is acted upon by pressure on all sides in the pressure chamber. As a result, mechanical strains on the carrier are better avoided than when the sensor is secured to a housing wall, for instance. It is also especially advantageous that intermediate parts of any kind can be dispensed with between the stub and the carrier, because the pressure chamber communicates with the intake tube directly via the stub.

Particularly with a view to simple assembly, to be described in further detail hereinafter, it has proved to be especially advantageous that the housing includes a base part, on which the stub is disposed and the carrier plate is secured by sealing adhesive connections that decouple mechanical strains, and a cap part connected to the base part that is disposed lying above the carrier and has a wall for forming the two chambers, in which the wall is connected to the carrier by a sealing adhesive connection that decouples mechanical strains.

To avoid strains on the cap part secured to the base part that can be transmitted to the carrier and thus to the pressure sensor, it is advantageously provided that the cap part is secured to the base part solely via sealing adhesive connections that decouple mechanical strains.

Purely in principle, the carrier part to which the pressure sensor is secured can protrude, floating freely, into the pressure chamber. An embodiment that is especially advantageous for the sake of assembly provides that a bearing face is provided on the base part in the pressure chamber, and the carrier is secured to this bearing face by a sealing adhesive that decouple mechanical strains.

To protect the pressure sensor from environmental influences, it is advantageously provided that a ring is disposed around the pressure sensor, and that the interstice between the ring and the pressure sensor is filled with a chemical-resistant gel.

For this purpose, fluorosilicone gel has proved especially advantageous.

To enable an especially direct coupling of the temperature sensor to the medium to be measured, it is advantageously provided that the temperature sensor is secured to the base part in such a way that it protrudes into the interior of the stub.

Purely in principle, the temperature sensor can be secured in the stub in various ways.

In one embodiment, it is provided that the terminal lines of the temperature sensor are clamped to two cheeks formed on the stub by a resilient clip bracket formed onto the stub. In this way, the temperature sensor can not only be mounted and positioned on the stub in a very simple way, but furthermore, because of the clamping connection imparted by the clip bracket, it becomes possible to secure the terminal lines of the temperature sensor without damage.

To assure that the temperature sensor and its terminal lines will not corrode or be damaged and attacked by other environmental influences, it is advantageously provided that the temperature sensor and its terminal lines are coated with a protective paint or a protective coating, preferably a polyester imide paint.

Particularly with a view to advantageous and simply achieved sealing of the terminal lines of the temperature sensor that are extended out of the pressure chamber, it is provided that the terminal line of the temperature sensor is passed through the sealing adhesive connection or sealing adhesive connections between the carrier and the base part.

Another embodiment provides that the temperature sensor is thrust into a receptacle formed in the stub and is secured by an adhesive connection that is disposed between the carrier and the base part and surrounds the ends of the terminal line of the temperature sensor.

This mode of securing has the advantage in particular that the temperature sensor can be secured in the stub from above; that is, for securing the temperature sensor, the same mounting direction is provided as for securing the pressure sensor.

To prevent corrosion and damage from environmental influences, in this case the terminal lines of the temperature sensor are advantageously Teflon-coated, except for their stripped ends for electrical contacting purposes, and it is provided that both the stripped ends and at least one portion of the Teflon-coated terminal lines are embedded in the adhesive connection. In this way, an especially stable connection is made, which at the same time is also insulating, because the adhesive composition adheres especially well to the stripped, non-Teflon-coated connection ends.

To enable especially simple assembly, it is moreover provided in an advantageous embodiment that for contacting the terminal lines of the temperature sensor to plug contact pins disposed in the base part and extended to the outside, insulation displacement connections are provided.

For contacting the terminal lines of the temperature sensor to plug contact pins disposed in the housing and extended to the outside, conductive adhesive connections and/or soldered connections and/or welded connections are preferably provided.

The object of the invention is furthermore attained by a method for producing an apparatus for detecting the pressure and the temperature in the intake tube of an internal combustion engine, which is characterized by the following steps:

securing a temperature sensor in a base part of a housing;

making the electrical contacting of the terminal line to plug contact pins which are provided in the base part;

securing the carrier to the base part by sealing adhesive connections that decouple mechanical strains;

contacting the electrical contact elements of the carrier with contact elements that are provided in the base part; and securing a cap part to the carrier and the base part by means of sealing adhesive connections.

By means of this method, fast and therefore economical production of a very precisely functioning device for detecting the pressure and the temperature in the intake tube of an internal combustion engine is especially advantageously possible.

BRIEF DESCRIPTION OF THE DRAWINGS

Further characteristics and advantages of the invention are the subject of the description below and are shown in several exemplary embodiments in the drawing.

Shown in the drawings are.

DESCRIPTION OF THE EXEMPLARY EMBODIMENTS

Figure 1:
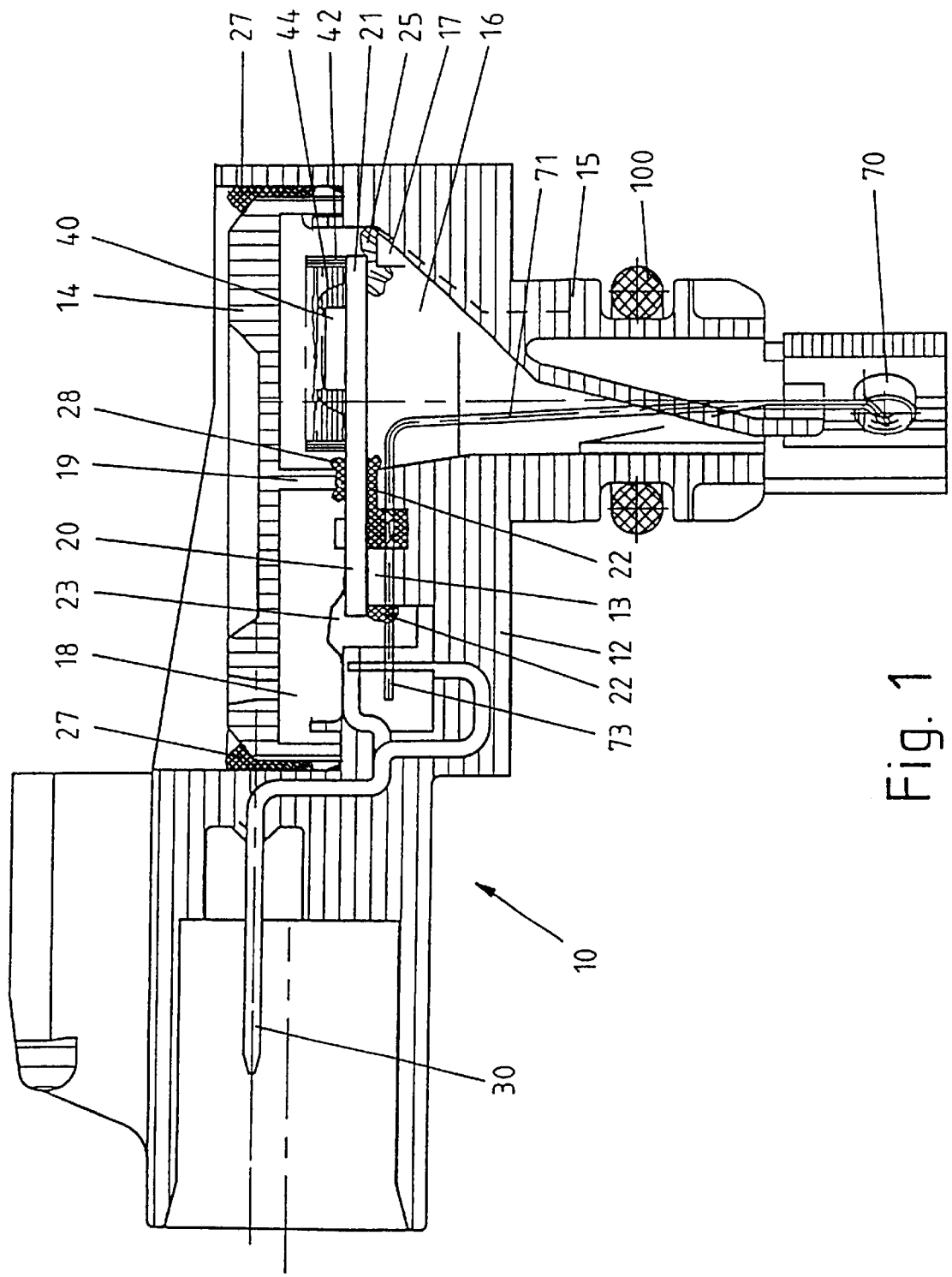
FIG. 1, a sectional view of a first exemplary embodiment of an apparatus according to the invention for detecting the pressure and the temperature in the intake tube of an internal combustion engine.

A first exemplary embodiment of an apparatus for detecting the pressure and the temperature in the intake tube of an internal combustion engine, shown in FIG. 1, includes a housing, designated in its entirety by reference numeral 10, which includes a base part 12 and a cap part 14.

The housing 10 is divided into two chambers, that is, a pressure chamber 16 and a further chamber 18 in which a carrier 20 is secured to the base part 12 by sealing adhesives 22 that decouple mechanical strains. The carrier 20 is secured to a rib 13 of the base part 12 in such a way that the carrier 20 merely rests on the rib 13. The rib 13 is disposed at the point at which bond wires 23 on the carrier 20 are contacted. The bond wires 23 make the electrical connection between flat plug contacts 30, which are disposed in the base part 12, and the electrical connecting lines on the carrier 20.

A pressure sensor 40 known per se is disposed on the carrier 20; it has a glass base and disposed on that a silicon chip, on whose surface an evaluation circuit, for instance, is provided, which is constructed, for instance in the form of a Wheatstone bridge, of piezoresistive resistor elements. The diaphragm required for detecting the pressure is made by etching the back side of the silicon chip. The connection of the silicon chip to the glass base is made under a vacuum, so that subsequently there is a vacuum in the cavern that is etched out.

The pressure sensor 40 oriented toward the cap part 14 is surrounded by a ring 42, for instance an IC ring. The interstice 44 between the ring 42 and the pressure sensor 40 is filled with a fluorosilicone gel. By means of this fluorosilicone gel, it is assured that the pressure sensor 40, including its thin-wire gold bonds, are protected against being touched and against contact with media, such as gasoline or condensed exhaust gas, present in an engine.

The pressure sensor 40 is disposed on a part 21 of the carrier 20 that protrudes into the pressure chamber 16. The pressure chamber 16 communicates with the intake tube (not shown) of the engine via the stub 15 that is joined in one piece to the base part 12. The evaluation circuit is preferably applied to the chip of the pressure sensor 40. It is also possible for the evaluation circuit to be applied to the side of the carrier 20 facing toward the cap 40 and located in the pressure chamber 16. In addition to the evaluation circuit, an EMV protection circuit can also be provided, for instance outside the pressure chamber, for instance in the chamber 18.

A bearing face 17 may be provided on the base part in the pressure chamber 16, to which the free end of the part 21 of the carrier 20 is secured via a sealing adhesive connection 25 that decouple mechanical strains. This connection serves the purpose primarily of assembly and prevents the carrier 20 during assembly from tipping into the pressure chamber 16.

The cap 14 is connected to the base part 12 by sealing adhesive connections 27 that decouple mechanical strains as well.

The cap 14, adjacent to the pressure sensor 40, has a wall 19 which is joined to the carrier 20 via a sealing adhesive connection 28 that decouple mechanical strains. By means of this wall 19, a pressure-proof subdivision of the housing into the two chambers 16, 18 is attained in an especially simple way. At the same time, the wall 19 serves to stabilize the carrier 20.

A temperature sensor 70 is disposed in the base part 12 in such a way that the temperature sensor protrudes into the stub 15. The terminal line 71 of the temperature sensor 70 extends through the sealing adhesive connection 21 between the base part 12 and the carrier 20.

Figure 2:
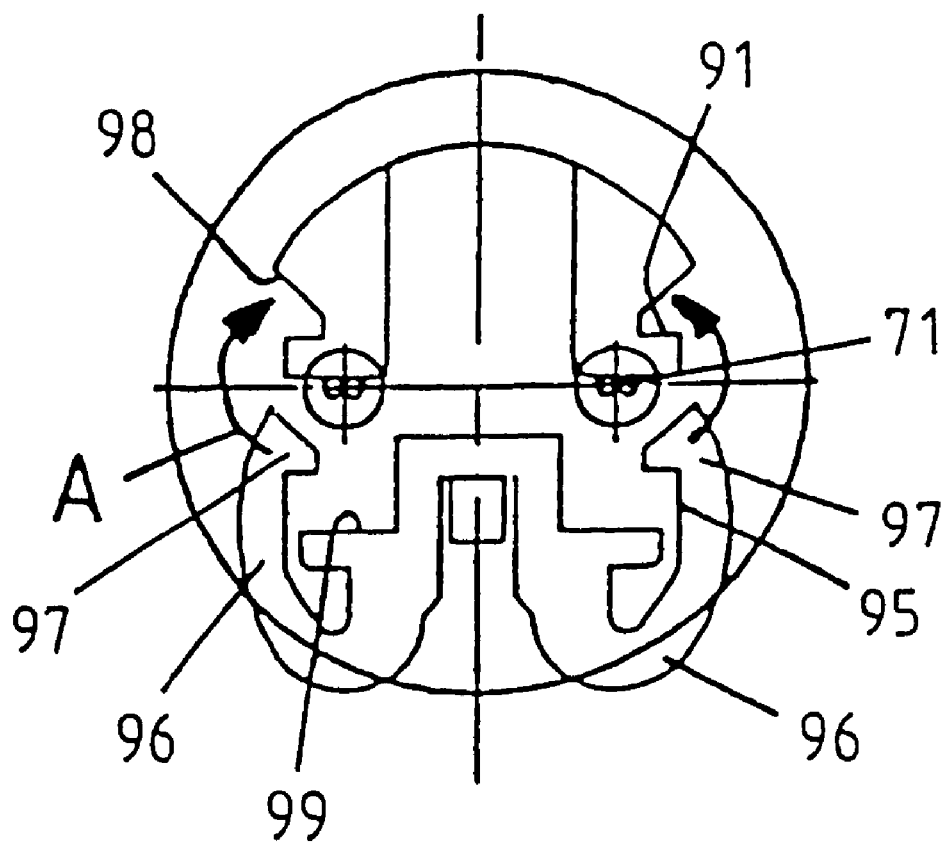
FIG. 2, a schematic plan view on a clip bracket used to secure a temperature sensor and disposed on the stub part.

In the exemplary embodiment shown in FIGS. 1 and 2, the temperature sensor, in the form of an NTC resistor, is secured by a resilient clip bracket 95 formed onto the stub 15. The clip bracket 95 is shown in FIG. 2 in the unmounted state. To secure the terminal line 71 of the temperature sensor 70, two clamping elements 96, which have detent protrusions 97 in their front region toward the terminal lines 71 of the temperature sensor 70, are pressed in such a way into detent openings 98, provided on the clip bracket 95, along directions represented by the arrows A that clamping faces 99, formed onto the cheeks 96, come to rest on the terminal lines 71 of the temperature sensor 70 and firmly clamp the terminal lines to protrusions 91 which are formed onto the stub part 15. The clip bracket 95 is designed such that an O-ring seal 100 (FIG. 1) for sealing the stub 15 can be slipped onto the stub 15 only whenever the temperature sensor 70 has already been secured to the stub part 15 by the clip connection described.

The terminal lines 71, bent at an angle, of the temperature sensor 70, after being extended to the outside through the sealing adhesive connections 22, are electrically conductively connected to plug contact pins 30 by means of an insulation displacement connection 73, known per se. To that end, the plug contact pins 30, in their lower region, have V-shaped openings (not shown) into which the terminal lines 71 of the temperature sensor 70 are pressed in a manner known per se.

Both the temperature sensor 70 and its terminal lines 71 are coated with a polyester imide protective paint, as a result of which not only is protection against media that act from outside on the temperature sensor 70 and its terminal line 70 is achieved, but an especially favorable response time of the temperature sensor is also attained.

Disposing the pressure sensor 40 in the pressure chamber 16 as described assures in an especially advantageous way that the entire pressure sensor 40 is located in the medium acted upon by a pressure, so that strains on the pressure sensor, which can occur if the pressure sensor is acted upon by the medium under pressure on only one side, are avoided.

It should be stressed that the bearing face 17, on which the part 21 of the carrier 20 to which the temperature sensor 40 is secured rests via a sealing adhesive connection 25 is not absolutely required. On the contrary, the part 21 of the carrier 20 to which the pressure sensor 40 is secured can also protrude, floating freely, into the pressure chamber 16.

Figure 3:
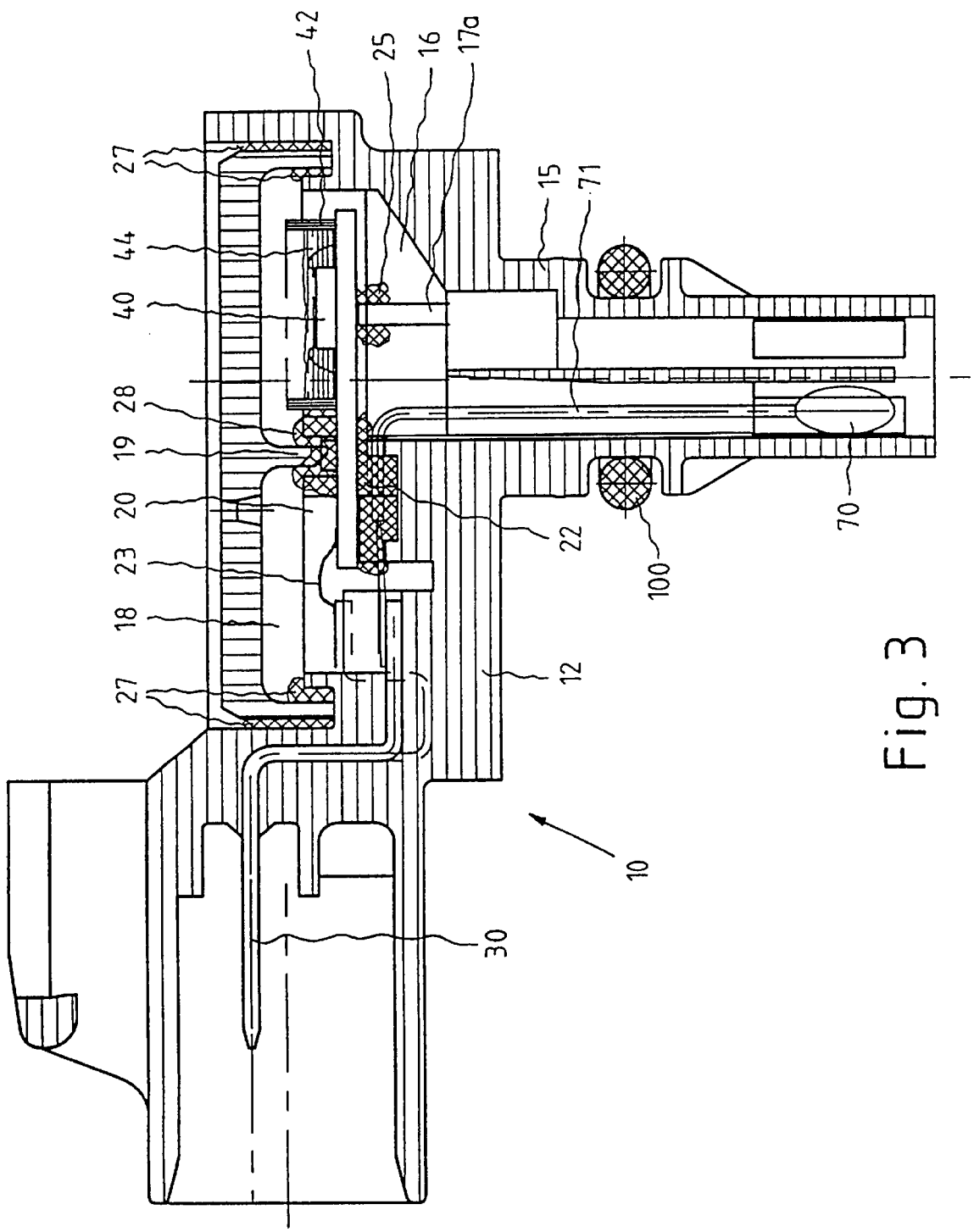
FIG. 3, a sectional view of a second exemplary embodiment of an apparatus of the invention for detecting the pressure and the temperature in the intake tube of an internal combustion engine.
Figure 4:
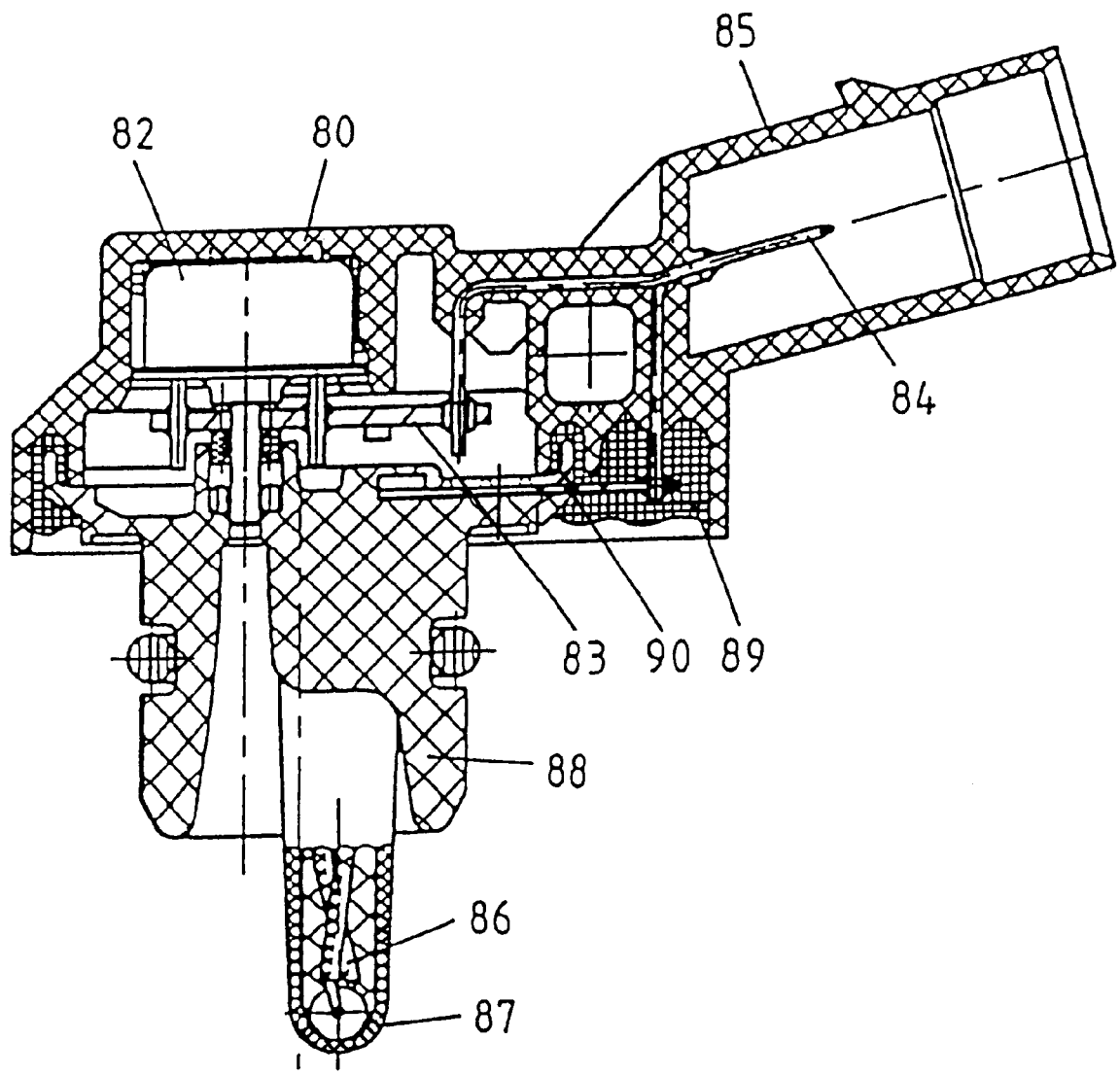
FIG. 4, an apparatus, known from the prior art, for detecting the pressure and the temperature in the intake tube of an internal combustion engine.

In a second exemplary embodiment of an apparatus for detecting the pressure and the temperature in the intake tube of an internal combustion engine, shown in FIG. 3, those elements that are identical to those in the first exemplary embodiment are provided with the same reference numerals, and so the description of the first exemplary embodiment is referred to in full for describing these elements.

In contrast to the first exemplary embodiment, however, the temperature sensor 70 is not secured to the stub 15 by a clip connection but rather is thrust from above into a receptacle provided for it. The terminal lines 71 of the temperature sensor 70 are bent at an angle and are secured at their ends in the sealing adhesive connection 22 disposed between the base part 12 and the carrier 20. The terminal lines 71 of the temperature sensor 70 are Teflon-coated, except for their ends that have been stripped for contacting purposes. The sealing adhesive connection 22 surrounds both the stripped ends and at least a portion of the Teflon-coated terminal lines 71. In this way, especially good securing is attained, because the adhesive composition adheres especially well to the stripped metal terminal leads.

Also in contrast to the exemplary embodiment shown in FIG. 1, the terminal lines of the temperature sensor 70 are contacted and connected to the plug contact pins 30 not by insulation displacement connections but rather by conductive adhesive connections, for instance, or welded connections or soldered connections.

Furthermore, instead of the bearing faces 17 disposed at the edge of the base part 12, dotlike bearing faces 17a are provided, which are disposed at any point below the carrier 20, for instance below the pressure sensor 40 as shown in FIG. 3.

The pressure sensor 40 shown in FIGS. 1 and 3 is preferably produced as follows. First, the temperature sensor 70 is secured to the stub 15 of the base part 12 in the manner described above. Next, the electrical terminal lines 71 of the temperature sensor 70 are contacted with the plug contact pins 30. This can be done by means of conductive adhesive connections, for instance. In that case, the curing time of such conductive adhesive connections can especially advantageously be combined during a time of sealing adhesive connections to be described below, by which the carrier is secured to the base part.

Next, the carrier 20 is secured to the base part 12 by the sealing adhesive connection 22, which maximally decouple mechanical strains. Then the electrical contacts are made between the conductor tracks on the carrier 20 and the plug contact pins 30 by means of bond wires 23. Finally, the cap 14 is secured to the base part 12 by means of sealing adhesive connections 19 between the carrier 20 and the cap 14 and between the cap 14 and the base part 12, respectively. In this way, because of the design of the cap 14 and the base part 12, the two chambers 16 and 18 are formed; the part 21 of the carrier 20 to which the pressure sensor 40 is secured is disposed in the pressure chamber 16.

The foregoing relates to a preferred exemplary embodiment of the invention, it being understood that other variants and embodiments thereof are possible within the spirit and scope of the invention, the latter being defined by the appended claims.

What is claimed is:

1. An apparatus for detecting a pressure and a temperature in an intake tube of an internal combustion engine, comprising a temperature sensor (70), a pressure sensor (40) and an evaluation circuit, the pressure sensor (40) is secured to a carrier (20) for analyzing a measurement result of the pressure sensor with as little strain as possible, the temperature sensor (70) and the pressure sensor (40) are disposed in a common housing (10), the housing (10) includes at least a first pressure chamber (16) and a second chamber (18) separate from one another and the temperature sensor (70) is disposed in a stub (15) of the housing (10), the first pressure chamber (16) communicates with the intake tube via said stub (15) and the first pressure chamber (16) is sealed off from the environment, said carrier (20) has a first portion (21) and a second portion, said first portion (21) of the carrier (20) on which the pressure sensor (40) is secured projects into the pressure chamber (16), and the second chamber (18) serves to receive and secure the second portion of the carrier (20) which includes connection elements (23), the carrier (20) is secured at the housing (10) by first and second sealing adhesive connections (22, 28) that decouple the carrier (20) from the housing (10) without mechanical strains and sealing off the first pressure chamber (16), and the temperature sensor (70) has terminal lines (71) which are secured in the housing (10) by the first sealing adhesive connections (22).

2. The apparatus according to claim 1, in which the housing (10) includes a base part (12), on which the stub (15) is disposed and the carrier (20) is secured by the first sealing adhesive connections (22) that decouple mechanical strains, and a cap part (14) is connected to the base part (12) and is disposed above the carrier (20), that cap part (14) has a wall (19) for forming the first pressure chamber (16) and the second chamber (18), and said wall is connected to the carrier (20) by the second sealing adhesive connection (28) that decouples mechanical strains.

3. The apparatus according to claim 2, in which the cap part (14) is secured to the base part (12) solely via third sealing adhesive connections (27) that decouple mechanical strains.

4. The apparatus according to claim 2, in which a bearing face (17) is provided on the base part in the pressure chamber (16), and the carrier is secured to said bearing face by a sealing adhesive (25) that decouples mechanical strains.

5. The apparatus according to claim 1, in which a ring (42) is disposed around the pressure sensor (40), and includes interstice (44) between the ring (42) and the pressure sensor (40) which is filled with a chemical-resistant gel.

6. The apparatus according to claim 2, in which a ring (42) is disposed around the pressure sensor (40), and includes interstice (44) between the ring (42) and the pressure sensor (40) which is filled with a chemical-resistant gel.

7. The apparatus according to claim 5, in which the chemical-resistant gel is a fluorosilicone gel.

8. The apparatus according to claims 1, in which the temperature sensor (70) is secured to the base part (12) in such a way that the temperature sensor (70) protrudes into the interior of the stub (15).

9. An apparatus for detecting a pressure and a temperature in an intake tube of an internal combustion engine, comprising a temperature sensor (70), a pressure sensor (40) and an evaluation circuit, the pressure sensor (40) and the evaluation circuit are secured to a carrier (20) for analyzing a measurement result of the pressure sensor with as little strain as possible, the temperature sensor (70) and the pressure sensor (40) are disposed in a common housing (10), the housing (10) includes at least a first pressure chamber (16) and a second chamber (18) separate from one another and the temperature sensor (70) is disposed in a stub (15) of the housing (10), the first pressure chamber (16) communicates with the intake tube via said stub (15) and the first pressure chamber (16) is sealed off from the environment, said carrier (20) has a first portion (21) and a second portion, said first portion (21) of the carrier (20) on which the pressure sensor (40) is secured projects into the pressure chamber (16), and the second chamber (18) serves to receive and secure the second portion of the carrier (20) which includes connection elements (23), the carrier (20) is secured at the housing (10) by first and second sealing adhesive connections (22, 28) that decouple the carrier (20) from the housing (10) without mechanical strains and sealing off the first pressure chamber (16), the temperature sensor (70) has terminal lines (71) which are secured in the housing (10) by the first sealing adhesive connection (22) to a base part (12) of the housing (10) in such a way that the temperature sensor (70) protrudes into the interior of the stub (15), whereby the temperature sensor (70) is thrust into a receptacle formed in the stub and is secured by the first adhesive connections (22) that are disposed between the carrier and the base part and surrounds the ends of the terminal lines (71) of the temperature sensor (70).

10. The apparatus according to claim 9, in which terminal lines (71) of the temperature sensor (70) are clamped to two cheeks (96) formed on the stub (15) by a resilient clip bracket (95) formed onto the stub (15).

11. The apparatus according to claim 9, in which the terminal line (71) of the temperature sensor is passed through one or more sealing adhesive connections (22) between the carrier (20) and the base part (12).

12. The apparatus according to claim 9, in which the terminal lines (71) of the temperature sensor (70) are Teflon-coated, except for stripped ends for contacting purposes, and that both the stripped ends and at least one portion of the Teflon-coated terminal lines (71) are embedded in the adhesive connection (22).

13. The apparatus according to claim 9, in which insulation displacement connections (73) are provided for contacting the terminal lines (71) of the temperature sensor (70) to plug contact pins (30) disposed in the base part (12) and extended to the outside.

14. The apparatus according to claim 9, in which conductive adhesive connections and/or soldered connections and/or welded connections are provided for contacting the terminal lines (71) of the temperature sensor (70) to plug contact pins (30) disposed in the base part (12) and extended to the outside.

15. An apparatus for detecting a pressure and a temperature in an intake tube of an internal combustion engine, comprising a temperature sensor (70), a pressure sensor (40) and an evaluation circuit, the pressure sensor (40) and the evaluation circuit are secured to a carrier (20) for analyzing a measurement result of the pressure sensor with as little strain as possible, the temperature sensor (70) and the pressure sensor (40) are disposed in a common housing (10), the housing (10) includes at least a first pressure chamber (16) and a second chamber (18) separate from one another and the temperature sensor (70) is disposed in a stub (15) of the housing (10), the first pressure chamber (16) communicates with the intake tube via said stub (15) and the first pressure chamber (16) is sealed off from the environment, said carrier (20) has a first portion (21) and a second portion, said first portion (21) of the carrier (20) on which the pressure sensor (40) is secured projects into the pressure chamber (16), and the second chamber (18) serves to receive and secure the second portion of the carrier (20) which includes connection elements (23), the carrier (20) is secured at the housing (10) by first and second sealing adhesive connections (22, 28) that decouple the carrier (20) from the housing (10) without mechanical strains and sealing off the first pressure chamber (16), the temperature sensor (70) has terminal lines (71) which are secured in the housing (10) by the first sealing adhesive connection (22) to a base part (12) of the housing (10) in such a way that the temperature sensor (70) protrudes into the interior of the stub (15), whereby the terminal lines (71) of the temperature sensor (70) are clamped to two cheeks (96) formed on the stub (15) by a resilient clip bracket (95) formed onto the stub (15) and in which the temperature sensor (70) and the terminal lines (71) are coated with a protective paint or a protective coating of a polyester imide paint.

16. The apparatus according to claim 15, in which the terminal line (71) of the temperature sensor is passed through one or more sealing adhesive connections (22) between the carrier (20) and the base part (12).

* * * * *